(12) United States Patent
Aharoni et al.

(10) Patent No.: US 10,311,218 B2
(45) Date of Patent: Jun. 4, 2019

(54) IDENTIFYING MACHINE-GENERATED STRINGS

(71) Applicant: International Business Machines Corporation, Armonk, NY (US)

(72) Inventors: Ehud Aharoni, Kfar Saba (IL); Tamer Salman, Haifa (IL); Onn M. Shehory, Kiryat-Ono (IL)

(73) Assignee: International Business Machines Corporation, Armonk, NY (US)

( * ) Notice: Subject to any disclaimer, the term of this patent is extended or adjusted under 35 U.S.C. 154(b) by 794 days.

(21) Appl. No.: 14/882,829

(22) Filed: Oct. 14, 2015

(65) Prior Publication Data
US 2017/0109515 A1   Apr. 20, 2017

(51) Int. Cl.
*G06F 21/31* (2013.01)

(52) U.S. Cl.
CPC ...... *G06F 21/31* (2013.01); *G06F 2221/2133* (2013.01)

(58) Field of Classification Search
CPC ... G06F 21/31; G06F 21/36; G06F 2221/2133
See application file for complete search history.

(56) References Cited

U.S. PATENT DOCUMENTS

| 8,260,914 B1 | 9/2012 | Ranjan | |
|---|---|---|---|
| 8,631,489 B2 * | 1/2014 | Antonakakis | H04L 61/1511 709/223 |
| 8,631,498 B1 | 1/2014 | Hart et al. | |
| 9,800,597 B2 * | 10/2017 | Bartos | H04L 63/1416 |
| 2012/0047153 A1 | 2/2012 | Thomas | |
| 2013/0191915 A1 * | 7/2013 | Antonakakis | H04L 63/14 726/23 |
| 2015/0334125 A1 * | 11/2015 | Bartos | H04L 63/1416 726/24 |
| 2016/0352679 A1 * | 12/2016 | Hagen | H04L 61/1511 |
| 2018/0077117 A1 * | 3/2018 | Hagen | H04L 63/0227 |

(Continued)

OTHER PUBLICATIONS

Yadav, Sandeep et al.; Detecting Algorithmically Generated Domain-Flux Attacks With DNS Traffic Analysis; 2012; IEEE/ACM Transactions on Networking, vol. 20, No. 5; pp. 1663-1677. (Year: 2012).*

(Continued)

*Primary Examiner* — Stanley K. Hill
(74) *Attorney, Agent, or Firm* — Kristofer L. Haggerty

(57) ABSTRACT

A computer receives human generated reference strings and determines the character, n-gram, type switch, and subtype switch distributions of the reference strings. Each of the aforementioned distributions include corresponding statistical data, such as an average frequency, maximum frequency, minimum frequency, and standard deviation. The computer then receives one or more test strings from which the computer similarly computes the aforementioned statistical data for each of the aforementioned distributions. The computer then compares the distributions of the test string(s) with the distributions of the reference strings. Based on the deviation of the test string distributions from the reference string distributions, the computer determines whether the test strings are human or machine generated.

20 Claims, 3 Drawing Sheets

(56) References Cited

U.S. PATENT DOCUMENTS

2018/0285565 A1* 10/2018 Konopisk ......... G06F 17/30985

OTHER PUBLICATIONS

Antonakakis, Manos et al.; From Throw-Away Traffic to Bots: Detecting the Rise of DGA-Based Malware; 2012; Security'12 Proceedings of the 21st USENIX conference on Security symposium; pp. 24-44. (Year: 2012).*

Krugel, Christopher et al.; Service Specific Anomaly Detection for Network Intrusion Detection; 2002 ACM; SAC 2002; pp. 201-208. (Year: 2002).*

Yadav et al., "Detecting Algorithmically Generated Malicious Domain Names," IMC'10, Nov. 1-3, 2010, Melbourne, Australia, ACM 978-1-4503-0057—May 10, 2011, pp. 48-61.

Haddadi et al., "Analyzing String Format-Based Classifiers for Botnet Detection: GP and SVM," 2013 IEEE Congress on Evolutionary Computation, Jun. 20-23, 2013, Cancún, México, pp. 2626-2633.

* cited by examiner

IDENTIFYING MACHINE-GENERATED STRINGS

TECHNICAL FIELD

The present invention relates generally to strings of characters, and more particularly to identifying machine generated strings of characters.

BACKGROUND

Unwanted and malicious files typically reside in a host's file system. While many such files are hidden by using legitimate file names and paths, there are many others which do not follow this approach and typically carry machine generated names and reside in a machine generated path. Yet, machine generated names and paths are not always easy to identify, as they may look to the naked eye very similar to other names and paths.

SUMMARY

Embodiments of the present invention disclose a method, system, and computer program product for identifying machine-generated strings. A computer receives human generated reference strings and determines the character, n-gram, type switch, and subtype switch distributions of the reference strings. Each of the aforementioned distributions include corresponding statistical data, such as an average frequency, maximum frequency, minimum frequency, and standard deviation. The computer then receives one or more test strings from which the computer similarly computes the aforementioned statistical data for each of the aforementioned distributions. The computer then compares the distributions of the test string(s) with the distributions of the reference strings. Based on the deviation of the test string distributions from the reference string distributions, the computer determines whether the test strings are human or machine generated.

DETAILED DESCRIPTION

Embodiments of the present invention will now be described in detail with reference to the accompanying figures.

Figure 1:
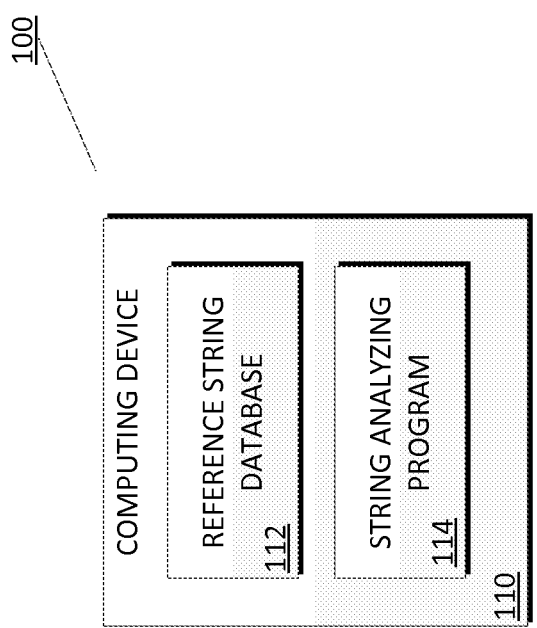
FIG. 1 illustrates string analyzing system 100, in accordance with an embodiment of the invention.

FIG. 1 illustrates a string analyzing system 100, in accordance with an embodiment of the invention. In the example embodiment, string analyzing system 100 includes computing device 110.

Computing device 110 includes reference string database 112 and string analyzing program 114. In the example embodiment, computing device 110 may be a laptop computer, a notebook, tablet computer, netbook computer, personal computer (PC), a desktop computer, a personal digital assistant (PDA), a smart phone, a thin client, or any other electronic device or computing system capable of receiving and sending data to and from other computing devices. While computing device 110 is shown as a single device, in other embodiments, computing device 110 may be comprised of a cluster or plurality of computing devices, working together or working separately. Computing device 110 is described in more detail with reference to FIG. 3.

In the example embodiment, reference string database 112 contains large amounts of human generated strings, or text, as well as the character distribution, the n-gram distribution, the type switch distribution, and the subtype switch distribution of each human generated string. In the example embodiment, the aforementioned distributions detail statistical information detailing the average, minimum, maximum, and standard deviation of each character, n-gram, type switch, or subtype switch. In addition to the aforementioned statistical data, reference string database 112 also includes other data indicative of human generation, such as distance between similar characters. In the example embodiment, the statistical information is normalized into a frequency, such as character instances per 100 string characters. In the example embodiment, reference strings are added to reference string database 112 via a user interface. While in the example embodiment string analyzing program 114 computes the aforementioned distributions using the reference strings contained in reference string database 112, in other embodiments, the statistical data of human generated reference strings may be input directly. In addition, reference string database 112 may be partitioned into domains such that the reference strings and character distributions of, for example web address strings, can be differentiated from the reference strings and character distributions of, for example, file name strings.

String analyzing program 114 is a program on computing device 110 capable of receiving reference strings, such as the reference strings stored in reference string database 112. String analyzing program 114 is further capable of analyzing the received reference strings and computing reference string distributions, such as character distributions, n-gram distributions, and type and/or subtype switch distributions. String analyzing program 114 is additionally capable of receiving the aforementioned reference string distributions via a user input rather than computing the distributions from the received reference strings. Furthermore, string analyzing program 114 is capable of receiving one or more test strings, analyzing the one or more test strings, and computing the distributions of the one or more test strings. String analyzing program 114 is additionally capable of comparing the reference string distribution to the test string distribution and determining whether the test string is human or machine-generated.

Figure 2:
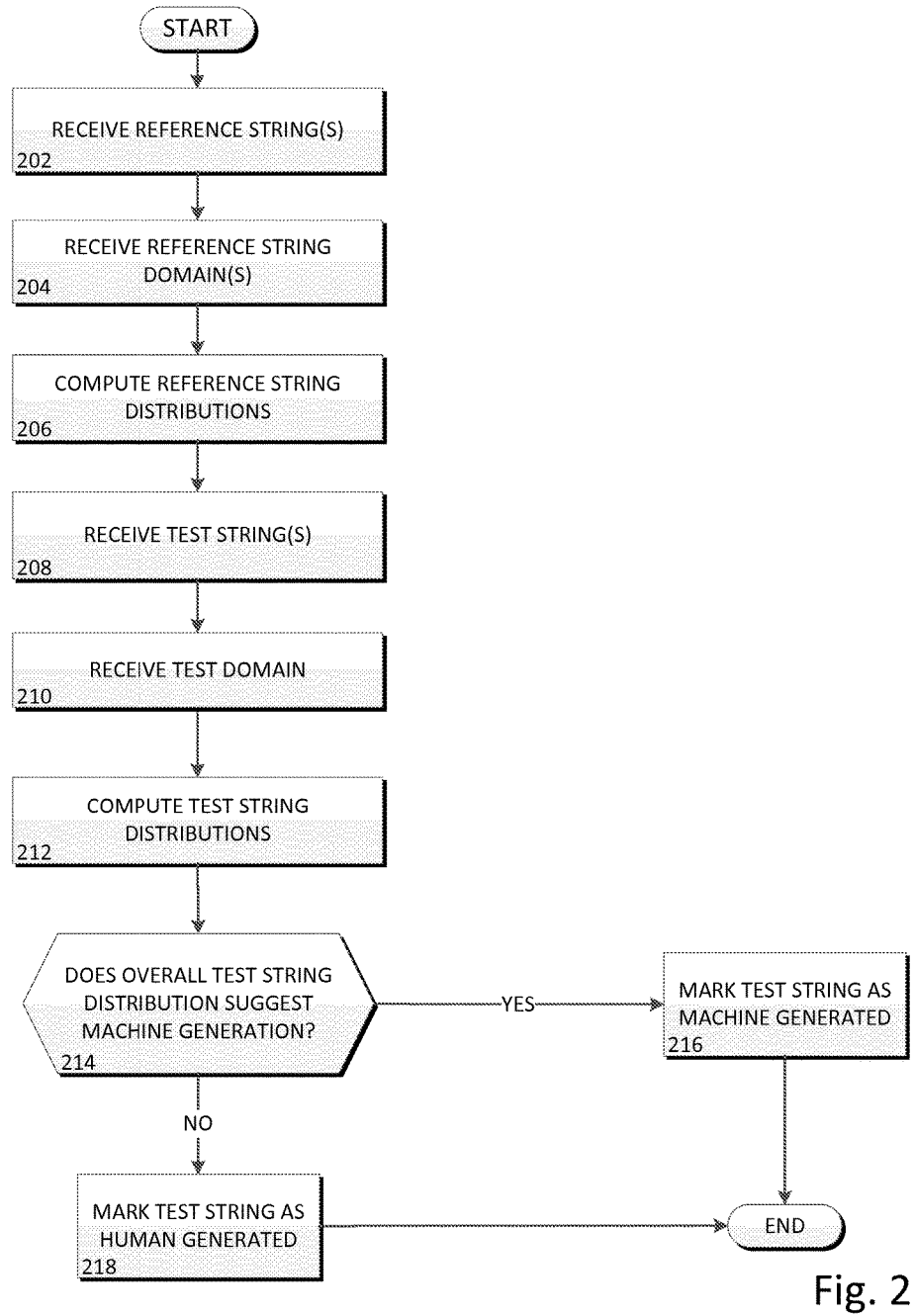
FIG. 2 is a flowchart illustrating the operations of a string analyzing program 114 of FIG. 1 in determining whether a string is machine-generated.

FIG. 2 is a flowchart depicting the operation of string analyzing program 114 in determining whether a string is human or machine generated, in accordance with an embodiment of the present invention.

String analyzing program 114 receives reference strings via a user interface on computing device 110 (step 202). In the example embodiment, string analyzing program 114 stores the reference strings in reference string database 112 upon receipt. In other embodiments, reference strings may be received by string analyzing program 114 remotely via a network before being stored in reference string database 112. In the example embodiment, the reference strings are human generated and used to compute distributions found in human generated strings (such as the character distribution, n-gram distribution, type switch distribution, and subtype switch distribution). The distributions found in the reference strings are later compared against a test string to determine whether test string exhibits a human-like distribution. Therefore, the reference strings are examples of particular types of human generated strings. For example, reference strings may include human generated filename strings if the string to be tested is a filename. Alternatively, the reference strings may include human generated web address strings if the test string is a web address. Reference strings can be added, removed, or modified within reference string database 112 at any time via a user interface. In the example embodiment, reference string database 112 contains strings made up of characters within the English language, however in other embodiments, reference string database 112 may contain strings in one or more other languages. In further embodiments, a user may not possess a large sample set of reference strings. Therefore, rather than inputting reference strings which are known to be human generated, a user may input a large set of only test strings. Assuming the test string set is a mix of mostly human and some machine generated strings (which is the case in many databases), statistical data of each individual test string of the test string set can be compared to the statistical data of the test string set as a whole to determine which test strings conform to the set as a whole and, thus, which test strings are human generated.

In the example embodiment, string analyzing program 114 receives the reference string domain(s) via the user input of string analyzing program 114 (step 204). While in the example embodiment string analyzing program 114 receives the string domain(s) locally, in other embodiments, string analyzing program 114 may receive the reference string domain(s) remotely via a network. Because each reference string, whether it be a web address string or a string of content within a document, contains different characters, the character distributions of each string may vary dependent on the nature of the string. For example, the character "/" (forward slash) may appear frequently in filename nomenclature, but appear very infrequently in the English language, resulting in different character distributions for each. Thus, a user is provided the option to categorize reference strings within a particular domain upon user input. In the example embodiment, test domains may be predefined by a user or system administrator by grouping particular criteria that are more relevant to the particular test strings, such as certain characters or n-grams. In addition to or alternative to selecting a group of criteria (domain), a user may also select individual criteria as well. Specifying a predefined test domain, individual criteria, or a combination of both are selected by the user via a dropdown menu within a user interface. If the user does not select a test domain nor any individual criteria, string analyzing program 114 will analyze the test string for all known criteria. In the example embodiment, domains are selected when adding reference strings to reference string database 112 using a drop down menu within said user interface. Furthermore, users or administrators are additionally capable of associating a prefix, suffix, extension, or format of the reference string with particular domains such that string analyzing program 114 is capable of identifying and suggesting which domain the reference string belongs. In order to identify the prefix, suffix, extension, etc., a user preloads string analyzing program 114 with n-grams (combinations of characters—for example bi-gram may be "xx" or a tri-gram may be "xxx") of the prefix, suffix, etc. to associate with specific domains. For example, if a user creates the domain "web addresses", associates the quad-gram "www." with the domain, and string analyzing program 114 identifies the quad-gram "www." within a string, then string analyzing program 114 suggests adding the reference string to the domain "web addresses". Similarly, if the user creates a domain "word processor", associates the quad-gram ".doc" with the domain, and string analyzing program 114 identifies a string ending in ".doc", then string analyzing program 114 suggests adding the reference string to the domain "word processor". In the example embodiment, the suggestion is pre-selected in the dropdown menu for the user/administrator to accept, override, or automate. Furthermore, having identified the prefix, suffix, or extension of a reference string, the identified extension is omitted from the computation of the distributions as the extensions are likely to skew the resulting distributions. In the example embodiment, domains may overlap or be mutually exclusive, depending on the configuration selected by the user/system administrator. For example, if a user would like to compute the distribution of the filename string Reference String1=YourDocument_WithComments.doc, then string analyzing program 114 identifies the quad-gram ".doc" and suggests adding Reference String1 to the "filenames" domain. Hereafter, assume the examples below are computed within the "filenames" domain.

String analyzing program 114 computes the distributions of the reference string (step 206). In the example embodiment, string analyzing program 114 computes the reference string distributions by analyzing the reference strings stored in reference string database 112. In the example embodiment, reference string distributions include the character distribution, n-gram distribution, type switch distribution, and subtype switch distribution. In other embodiments, other distributions indicative of human generation may also be computed.

String analyzing program 114 computes the reference character distribution by searching each reference string stored in reference string database 112 for known characters. In the example embodiment, known characters are pre-loaded onto string analyzing program 114 by an administrator/user and include alphabetical letters (a, B, C, etc.), numerals (1, 2, 3, etc.), punctuation marks (-, ( ), !, @, ?, spaces, etc.), mathematical/Boolean characters (<, >, +, =, etc.), and other symbols found in the English language. In the example embodiment, string analyzing program 114 omits characters recognized as file formats, extensions, suffixes, or prefixes that have no significance to the chosen string name, such as ".doc" or "www." (described in greater detail below). String analyzing program 114 determines how many of each character are present in the string compared to the total amount of characters in the string (including spaces). For example, if string analyzer program searches Reference String1=YourDocument_WithComments.doc for the character "o", then string analyzer program determines that there are 3 instances of the character "o" and 25 characters total (YourDocument_WithComments). Therefore, the character "o" has frequency of 3/25 (12%) in Reference String1. This process is repeated for all known characters and all known reference strings in reference string database 112 (character distributions may be separated by domain, if desired). The results are compiled into a reference character distribution and includes statistics such as the average character frequency, maximum character frequency, minimum character frequency, and standard deviation of the character. Thus, continuing the example above, if another reference string also containing 25 characters (Reference String2) is determined to contain five instances of the character "o", then string analyzing program 114 averages the 3 instances of the character "o" found in Reference String1 and the 5 instances of the character "o" in Reference String2 to compute an average character "o" frequency of 4. Furthermore, string analyzing program 114 compares the frequency of the character "o" between reference strings to determine a minimum frequency and a maximum frequency. Continuing the example above, if string analyzing program 114 compares the maximum and minimum character frequency of character "o" in Reference String1 and Reference String2, then string analyzing program 114 determines that the 5 instances of character "o" in Reference String2 is the maximum frequency and the 3 instances of character "o" in Reference String1 is the minimum frequency. From this determination, string analyzing program 114 further computes statistics such as the variance and standard deviation. This process is repeated for every known character (a, b, 1, !) within Reference String1 and every other reference string within the domain or reference string database 112. Continuing the example above, if string analyzing program 114 searches 100 reference strings for the character "o", then string analyzing program 114 computes the reference character distribution of the character "o" as follows:

Minimum (min.)=0;
Maximum (max.)=10;
Average (ave.)=3; and
Standard Deviation (std)=2.

String analyzing program 114 computes the reference n-gram distribution by searching each reference string stored in reference string database 112 for known n-grams. An n-gram is a combination of two or more characters. For example, common n-grams in the English language include "ei", "ie", "oo", "ing", and "ent". In the example embodiment, a user or administrator preloads string analyzing program 114 with known n-grams to search for, such as the n-grams enumerated above. Known n-grams may be added to reference string database 112 by a user or administrator through the user interface of string analyzing program 114 locally or remotely via a network. Additionally, n-grams representative of a prefix, suffix, file extension, format, etc. are added to the known n-gram database and neglected from reference string computation when identified to filter out characters which may skew the resulting distribution (for example, including the extension ".pdf" in computing a character distribution may skew the resulting distribution in favor of the characters "p", "d", and "f" even though extensions are not indicative of human generation). Continuing the example above, if string analyzing program 114 searches Reference String1=YourDocument_WithComments.doc for the n-gram "ent", then string analyzing program 114 determines that there are 2 instances of the n-gram "ent" and 25 characters total (YourDocument_WithComments). Thus, the frequency of the n-gram "ent" within Reference String1 is 2/25 (8%). In much the same way the statistics are computed for the reference character distribution, string analyzing program 114 also computes the minimum frequency, maximum frequency, average frequency, and standard deviation of the known n-gram within the reference strings and combines it with the n-gram statistics computed for other n-grams and reference strings within the domain or reference string database 112. Continuing the example above, if string analyzing program 114 searches 100 reference strings for the n-gram "ent", then string analyzing program 114 computes the reference n-gram distribution of the n-gram "ent" as follows:

Min.=0;
Max.=8;
Ave.=2; and
Std.=1.

In the example embodiment, note that the frequency of the n-gram is mutually exclusive of the character frequency. For example, the n-gram "ent" is mutually exclusive of the count of characters "e", "n", and "t". Therefore, the same character, such as the character "e", may be counted for both the character "e" frequency as well as the n-gram "ent" frequency.

String analyzing program 114 computes the reference type switch distribution by searching each reference string stored in reference string database 112 for known type switches. A type switch is a change between two different types of characters. Types of characters may be defined by a user or administrator via a user interface on string analyzing program 114 locally or remotely. For example, the type of character "a" is a lowercase letter, the type of character "A" is an uppercase letter, the type of character "1" is a numeral, and the type of character ":" is a punctuation. Type switches occur every time consecutive characters change types, such as uppercase letter to lowercase letter (Aa), uppercase letter to numeral (A1), lowercase letter to punctuation (a.), and punctuation to numeral (.1). In the example embodiment, character types are predefined for characters by a user or system administrator and may be defined as broad or specific as desired. Character types may be dependent on the characters commonly associated with a particular domain, and in some cases character types may not be assigned at all. String analyzing program 114 searches the reference string for known type switches to determines how many occurrences of each known type switch occur per string. Using the example above, if string analyzing program 114 searches Reference String1=YourDocument_WithComments.doc for type switches from an uppercase letter to a lowercase letter, then string analyzing program 114 determines that there are 4 instances of type switching from an uppercase letter to a lowercase letter and a total of 25 characters (YourDocument_WithComments). Much like in the reference character and reference n-gram distribution computations, string analyzing program 114 additionally computes and compiles the minimum frequency, maximum frequency, average frequency, standard deviation, and other statistics for type switches within other reference strings of the same domain or reference string database 112. For example, if string analyzing program 114 searches 100 reference strings for type switches from an uppercase letter to a lowercase letter, then string analyzing program 114 computes the reference type switch distribution of type switches from an uppercase letter to a lowercase letter as follows:

Min.=0;
Max.=8;
Ave.=4; and
Std.=2.5.

String analyzing program 114 computes the reference subtype switch distribution by searching each reference string stored in reference string database 112 for subtype switches. Similar to type switches, subtype switches further define the type of a character. For example, the character "A" has a type which identifies it as an uppercase letter as well as a subtype which classifies it as a vowel. A subtype switch occurs every time consecutive characters change subtypes. Similar to defining types of characters, defining subtypes of characters may be highly dependent on the domain of the string, and in some cases character subtypes may not be assigned at all. Using the example above, if string analyzing program 114 searches Reference String1=YourDocument_WithComments.doc for the subtype switch of consonants to vowels, then string analyzing program 114 determines that there are 7 instances of subtype switching from consonants to vowels (YourDocument_WithComments). String analyzing program 114 computes the minimum frequency, maximum frequency, average frequency, standard deviation, and other statistics for subtype switches within other reference strings in much the same way it does for the character, n-gram, and type switch distributions. For example, if string analyzing program 114 searches 100 reference strings for subtype switches from a consonant to a vowel, then string analyzing program 114 computes the reference subtype switch distribution of subtype switches from a consonant to a vowel as follows:
Min.=0;
Max.=8;
Ave.=5; and
Std.=2.5.

String analyzing program 114 receives a test string via user input (step 208). In the example embodiment, string analyzing program 114 receives a test string via a user input on computing device 110, however in other embodiments, string analyzing program 114 may receive the test string remotely via a network. Furthermore, in the example embodiment, string analyzing program 114 can receive single or multiple test strings based on the files, folders, drives, networks, etc. selected for analyzing.

String analyzing program 114 receives the test domain selection of the user (step 210). The test domain specifies which criteria, such as specific characters, n-grams, type switches, and subtype switches, are to be searched for based on the particular test string or batch of test strings. Test domains are advantageous because searching a test string for every known character, n-gram, type switch, and subtype switch are both time and resource consuming. By selecting a predefined domain, a user can narrow down specific criteria which are more relevant to the current test string. In the example embodiment, test domains are suggested by string analyzing program 114 similar to how string analyzing program 114 suggests a reference string test domain above. For example, if a user inputs Test String2=YoURdOcUmeNT_WitHcOmmEnTS.doc and Test String3=YrDcmnt_WthCmmnts.doc into string analyzing program 114, then string analyzing program 114 identifies the quad-gram ".doc" and suggests searching Test String1 and Test String2 with regard to the domain "filenames".

String analyzing program 114 computes the test distribution of the test string(s) (step 212). String analyzing program 114 computes the test distribution in much the same way as it computes the reference distribution above, however the distribution is computed of a test string rather than a human generated reference string. Therefore, the test distribution includes an average test frequency, a maximum test frequency, a minimum test frequency, and a test standard deviation.

String analyzing program 114 computes the test character distribution by searching each test string for known characters in much the same way string analyzing program 114 searches for known characters when computing the reference character distribution. For example, if string analyzing program 114 computes the test distribution of character "o" in Test String2=YoURdOcUmeNT_WitHcOmmEnTS.doc, then string analyzing program 114 determines that there are 3 instances of the character "o" and 25 characters total (YoURdOcUmeNT_WitHcOmmEnTS). Referencing the example above, the reference character distribution of the character "o" is as follows:
Minimum (min.)=0;
Maximum (max.)=10;
Average (ave.)=3; and
Standard Deviation (std)=2.

String analyzing program 114 compares the test character distribution of the character "o" to the reference character distribution of the character "o" (note that the compared values must be normalized to a common string length before compared, such as 25 characters). In the example embodiment, a test string is presumed human generated if the average test character frequency (average test frequency) is within one reference standard deviation of the average reference character frequency (average reference frequency). In other embodiments, however, the presumption of human generation may be defined by other comparisons, such as the average test character frequency falling within two standard deviations of the average reference character frequency or falling within the minimum reference frequency and maximum reference frequency. Therefore, because the frequency of the character "o" within the Test String2 (frequency=3) is within one standard deviation (sd=2) of the average reference character frequency (ave.=3), string analyzing program 114 presumes Test String2 is human generated. This process is repeated for every character within the test domain (not just the characters in Test String2) such that lack of a character within a test string is taken into consideration as well. Using the example above where Test String2 lacks the character "a", if the reference character distribution of the character "a" has an average reference character frequency of 5 and a standard deviation of 2, then string analyzing program 114 would presume the test string is machine generated because the frequency of the character "a" within Test String2 (frequency=0) is outside of one standard deviation (sd=2) of the average reference character frequency (ave.=5). After string analyzing program 114 compares the characters in the test string to every character within the test domain, the presumptions for each character are saved for later reference. In the example embodiment, characters may be weighted such that they have stronger presumptions toward human or machine generation when cumulatively reviewed.

String analyzing program 114 computes the test n-gram distribution by searching each test string for known n-grams in much the same way string analyzing program 114 computes the reference n-gram distribution. For example, if string analyzing program 114 searches Test String2=YoURdOcUmeNT_WitHcOmmEnTS.doc for the n-gram "ent", then string analyzing program 114 determines that there are 2 instances of the n-gram "ent" and 25 characters total (YoURdOcUmeNT_WitHcOmmEnTS). Referencing the example above, the reference n-gram distribution of the n-gram "ent" is as follows:
Min.=0;
Max.=8;
Ave.=2; and
Std.=1.

In the example embodiment, a string is presumed human generated if the test n-gram frequency is within one standard deviation of the average reference n-gram frequency. Thus, because the frequency of n-grams "ent" in the test string (frequency=2) is within one standard deviation (sd=1) of the average reference n-gram frequency (ave.=2), string analyzing program 114 presumes Test String2 is human generated. After string analyzing program 114 compares the n-grams in the test strings to every known n-gram within the test domain (or reference string database 112), the presumptions for each character and test string are saved for later reference.

String analyzing program 114 computes the test type switch distribution by searching each test string for known type switches in much the same way string analyzing program 114 computes the reference type switch distribution. For example, if string analyzing program 114 searches Test String2=YoURdOcUmeNT_WitHcOmmEnTS.doc for the type switch from an uppercase letter to a lowercase letter, then string analyzing program 114 determines that there are 7 instances of type switches from an uppercase letter to a lowercase letter and 25 characters total (YoURdOcUmeNT_WitHcOmmEnTS). Referencing the example above, the reference type switch distribution of the type switch from uppercase letter to lowercase letter is as follows:

Min.=0;
Max.=8;
Ave.=4; and
Std.=2.5.

In the example embodiment, a string is presumed human generated if the test type switch frequency of the test string is within one standard deviation of the average reference type switch frequency. Thus, because the frequency of type switches from an uppercase letter to a lowercase letter in the test string (frequency=7) is outside of one standard deviation (sd=2.5) of the reference average (ave.=4), string analyzing program 114 presumes Test String2 is machine generated. After string analyzing program 114 compares the type switches in the test strings to every known type switch within the test domain, the presumptions for each character are saved for later reference.

String analyzing program 114 computes the test subtype switch distribution by searching each test string for known subtype switches in much the same way string analyzing program 114 computes the reference subtype switch distribution. For example, if string analyzing program 114 searches Test String2=YoURdOcUmeNT_WitHcOmmEnTS.doc for the subtype switch from a consonant to a vowel, then string analyzing program 114 determines that there are 7 instances of subtype switches from a consonant to a vowel and 25 characters total (YoURdOcUmeNT_WitHcOmmEnTS). Referencing the example above, the reference subtype switch distribution of the subtype switch from consonant to vowel is as follows:

Min.=0;
Max.=8;
Ave.=5; and
Std.=2.5.

In the example embodiment, a string is presumed human generated if the test subtype switch frequency is within one reference standard deviation of the average reference subtype switch frequency. Thus, because the frequency of subtype switches from consonants to vowels in the test string (frequency=7) is within one standard deviation (sd=2.5) of the reference average (ave.=5), string analyzing program 114 presumes Test String2 is human generated. After string analyzing program 114 compares the subtype switches in the test strings to every known subtype switch within the test domain (or reference string database 112), the presumptions for each character are saved for later reference.

String analyzing program 114 determines whether the cumulative presumptions of the test character distribution, test n-gram distribution, test type switch distribution, and test subtype switch distribution suggest machine generation (decision 214). The resulting determination is known as the test string determination. In the example embodiment, string analyzing program 114 determines a test string determination favoring machine generation if greater than 50% of the presumptions determined for each character, n-gram, type switch, and subtype switch of the test string suggests machine generation. For example, if the presumption of the character "a", n-gram "ent", and the type switch from an uppercase letter to lowercase letter suggest human generation while 2 other criteria suggest machine generation, then string analyzing program 114 determines a test string determination of human generation because more than 50% of the determinations (3/5) suggest machine generation. In other embodiments, a user or system administrator may configure string analyzing program 114 to determine human/machine generation based on other criteria or comparisons, such as requiring 75% of the criteria to suggest human generation or making a determination for each individual distribution separately.

If string analyzing program 114 determines that the cumulative result suggests that the test string is machine generated (decision 214 "YES" branch), then string analyzing program 114 marks the test string as machine generated (step 216). Test strings marked as machine generated are listed to the user in descending order of machine generated presumptions. In the example embodiment, the resulting list is utilized by a user to search, inspect, ignore, delete, quarantine, or otherwise modify the listed test strings.

If string analyzing program 114 determines that the cumulative result does not suggest that the test string is machine generated (decision 214 "NO" branch), then string analyzing program 114 marks the test string as human generated (step 218). In the example embodiment, when a string is determined to be human generated, string analyzing program 114 provides the user a list of the test strings similar to the list provided for test strings determined to be machine generated in the step above. String analyzing program 114 additionally provides the option of adding the test string and the corresponding distribution to reference string database 112 as a reference for future test strings.

Figure 3:
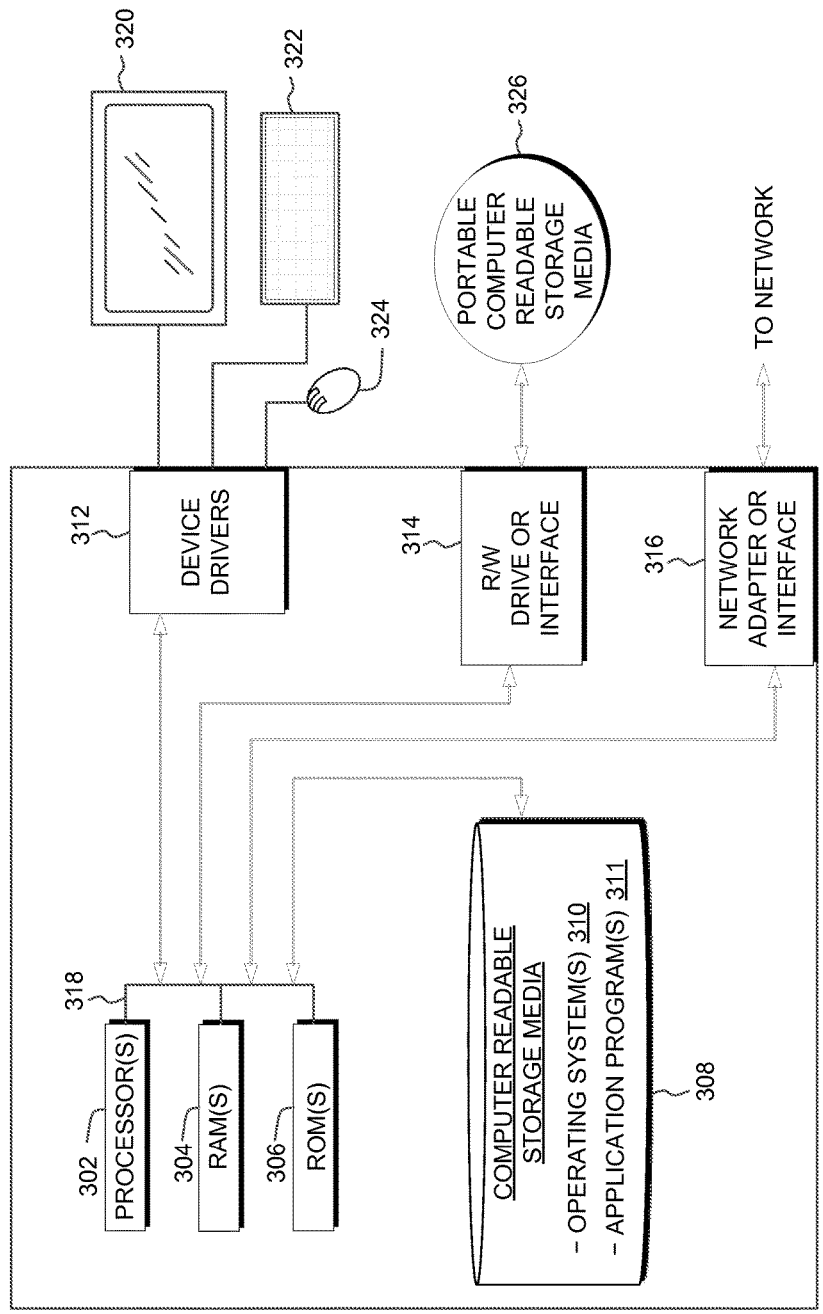
FIG. 3 is a block diagram depicting the hardware components of a string analyzing system of FIG. 1, in accordance with an embodiment of the invention.

FIG. 3 depicts a block diagram of components of computing device 110 of a string analyzing system 100 of FIG. 1, in accordance with an embodiment of the present invention. It should be appreciated that FIG. 3 provides only an illustration of one implementation and does not imply any limitations with regard to the environments in which different embodiments may be implemented. Many modifications to the depicted environment may be made.

Computing device 110 may include one or more processors 302, one or more computer-readable RAMs 304, one or more computer-readable ROMs 306, one or more computer readable storage media 308, device drivers 312, read/write drive or interface 314, network adapter or interface 316, all interconnected over a communications fabric 318. Communications fabric 318 may be implemented with any architecture designed for passing data and/or control information between processors (such as microprocessors, communications and network processors, etc.), system memory, peripheral devices, and any other hardware components within a system.

One or more operating systems 310, and one or more application programs 311, for example, string analyzing program 114, are stored on one or more of the computer readable storage media 308 for execution by one or more of the processors 302 via one or more of the respective RAMs 304 (which typically include cache memory). In the illustrated embodiment, each of the computer readable storage media 308 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device 110 may also include a R/W drive or interface 314 to read from and write to one or more portable computer readable storage media 326. Application programs 311 on computing device 110 may be stored on one or more of the portable computer readable storage media 326, read via the respective R/W drive or interface 314 and loaded into the respective computer readable storage media 308.

Computing device 110 may also include a network adapter or interface 316, such as a TCP/IP adapter card or wireless communication adapter (such as a 4G wireless communication adapter using OFDMA technology). Application programs 311 on computing device 110 may be downloaded to the computing device from an external computer or external storage device via a network (for example, the Internet, a local area network or other wide area network or wireless network) and network adapter or interface 316. From the network adapter or interface 316, the programs may be loaded onto computer readable storage media 308. The network may comprise copper wires, optical fibers, wireless transmission, routers, firewalls, switches, gateway computers and/or edge servers.

Computing device 110 may also include a display screen 320, a keyboard or keypad 322, and a computer mouse or touchpad 324. Device drivers 312 interface to display screen 320 for imaging, to keyboard or keypad 322, to computer mouse or touchpad 324, and/or to display screen 320 for pressure sensing of alphanumeric character entry and user selections. The device drivers 312, R/W drive or interface 314 and network adapter or interface 316 may comprise hardware and software (stored on computer readable storage media 308 and/or ROM 306).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

Various embodiments of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for string analyzing, the method comprising:
   determining a reference string character distribution of one or more reference strings that includes a reference character minimum, a reference character maximum, a reference character average, and a reference character standard deviation;
   determining a test string character distribution of one or more test strings that includes a test character minimum, a test character maximum, a test character average, and a test character standard deviation; and
   identifying the one or more test strings as human generated based on determining that the test character average is within a threshold number of the reference character standard deviations of the reference character average.

2. The method of claim 1, further comprising:
   determining a reference string n-gram distribution of the one or more reference strings that includes a reference n-gram minimum, a reference n-gram maximum, a reference n-gram average, and a reference n-gram standard deviation;
   determining a test string n-gram distribution of the one or more test strings that includes a test n-gram minimum, a test n-gram maximum, a test n-gram average, and a test n-gram standard deviation; and
   wherein identifying the one or more test strings as human generated is further based on determining that the test n-gram average is within the threshold number of the reference n-gram standard deviations of the reference n-gram average.

3. The method of claim 1, further comprising:
   determining a reference string type switch distribution of the one or more reference strings that includes a reference type switch minimum, a reference type switch maximum, a reference type switch average, and a reference type switch standard deviation;
   determining a test string type switch distribution of the one or more test strings that includes a test type switch minimum, a test type switch maximum, a test type switch average, and a test type switch standard deviation; and
   wherein identifying the one or more test strings as human generated is further based on determining that the test type switch average is within the threshold number of the reference type switch standard deviations of the reference type switch average.

4. The method of claim 1, further comprising:
   determining a reference string subtype switch distribution of the one or more reference strings that includes a reference subtype switch minimum, a reference subtype switch maximum, a reference subtype switch average, and a reference subtype switch standard deviation;
   determining a test string subtype switch distribution of the one or more test strings that includes a test subtype switch minimum, a test subtype switch maximum, a test subtype switch average, and a test subtype switch standard deviation; and
   wherein identifying the one or more test strings as human generated is further based on determining that the test subtype switch average is within the threshold number of the reference subtype switch standard deviations of the reference subtype switch average.

5. The method of claim 1, wherein identifying the one or more test strings as human generated is further based on determining that the test character average is between the reference character minimum and the reference character maximum.

6. The method of claim 1, further comprising:
   based on not identifying the one or more test strings as human generated, providing an option to search, inspect, ignore, delete, or quarantine the one or more test strings.

7. The method of claim 1, wherein the one or more reference strings and the one or more test strings may be classified by one or more domains, and wherein identifying the one or more test strings as human generated is further based on the classified one or more domains.

8. A computer program product for string analyzing, the computer program product comprising:
   one or more computer-readable non-transitory storage media and program instructions stored on the one or more computer-readable storage media, the program instructions comprising:
   program instructions to determine a reference string character distribution of one or more reference strings that includes a reference character minimum, a reference character maximum, a reference character average, and a reference character standard deviation
   program instructions to determine a test string character distribution of one or more test strings that includes a test character minimum, a test character maximum, a test character average, and a test character standard deviation program instructions to identify the one or more test strings as human generated based on determining that the test character average is within a threshold number of the reference character standard deviations of the reference character average.

9. The computer program product of claim 8, further comprising:
program instructions to determine a reference string n-gram distribution of the one or more reference strings that includes a reference n-gram minimum, a reference n-gram maximum, a reference n-gram average, and a reference n-gram standard deviation;
program instructions to determine a test string n-gram distribution of the one or more test strings that includes a test n-gram minimum, a test n-gram maximum, a test n-gram average, and a test n-gram standard deviation; and
wherein the program instructions to identify the one or more test strings as human generated is further based on determining that the test n-gram average is within the threshold number of the reference n-gram standard deviations of the reference n-gram average.

10. The computer program product of claim 8, further comprising:
program instructions to determine a reference string type switch distribution of the one or more reference strings that includes a reference type switch minimum, a reference type switch maximum, a reference type switch average, and a reference type switch standard deviation;
program instructions to determine a test string type switch distribution of the one or more test strings that includes a test type switch minimum, a test type switch maximum, a test type switch average, and a test type switch standard deviation; and
wherein the program instructions to identify the one or more test strings as human generated is further based on determining that the test type switch average is within the threshold number of the reference type switch standard deviations of the reference type switch average.

11. The computer program product of claim 8, further comprising:
program instructions to determine a reference string subtype switch distribution of the one or more reference strings that includes a reference subtype switch minimum, a reference subtype switch maximum, a reference subtype switch average, and a reference subtype switch standard deviation;
program instructions to determine a test string subtype switch distribution of the one or more test strings that includes a test subtype switch minimum, a test subtype switch maximum, a test subtype switch average, and a test subtype switch standard deviation; and
wherein the program instructions to identify the one or more test strings as human generated is further based on determining that the test subtype switch average is within the threshold number of the reference subtype switch standard deviations of the reference subtype switch average.

12. The computer program product of claim 8, wherein identifying the one or more test strings as human generated is further based on determining that the test character average is between the reference character minimum and the reference character maximum.

13. The computer program product of claim 8, further comprising:
based on not identifying the one or more test strings as human generated, program instructions to provide an option to search, inspect, ignore, delete, or quarantine the one or more test strings.

14. The computer program product of claim 8, wherein the one or more reference strings and the one or more test strings may be classified by one or more domains, and wherein identifying the one or more test strings as human generated is further based on the classified one or more domains.

15. A computer system for string analyzing, the computer system comprising:
one or more computer processors, one or more computer-readable storage media, and program instructions stored on one or more of the computer-readable storage media for execution by at least one of the one or more processors, the program instructions comprising:
program instructions to determine a reference string character distribution of one or more reference strings that includes a reference character minimum, a reference character maximum, a reference character average, and a reference character standard deviation
program instructions to determine a test string character distribution of one or more test strings that includes a test character minimum, a test character maximum, a test character average, and a test character standard deviation
program instructions to identify the one or more test strings as human generated based on determining that the test character average is within a threshold number of the reference character standard deviations of the reference character average.

16. The computer system of claim 15, further comprising:
program instructions to determine a reference string n-gram distribution of the one or more reference strings that includes a reference n-gram minimum, a reference n-gram maximum, a reference n-gram average, and a reference n-gram standard deviation;
program instructions to determine a test string n-gram distribution of the one or more test strings that includes a test n-gram minimum, a test n-gram maximum, a test n-gram average, and a test n-gram standard deviation; and
wherein the program instructions to identify the one or more test strings as human generated is further based on determining that the test n-gram average is within the threshold number of the reference n-gram standard deviations of the reference n-gram average.

17. The computer system of claim 15, further comprising:
program instructions to determine a reference string type switch distribution of the one or more reference strings that includes a reference type switch minimum, a reference type switch maximum, a reference type switch average, and a reference type switch standard deviation;
program instructions to determine a test string type switch distribution of the one or more test strings that includes a test type switch minimum, a test type switch maximum, a test type switch average, and a test type switch standard deviation; and
wherein the program instructions to identify the one or more test strings as human generated is further based on determining that the test type switch average is within the threshold number of the reference type switch standard deviations of the reference type switch average.

18. The computer system of claim 15, further comprising:

program instructions to determine a reference string subtype switch distribution of the one or more reference strings that includes a reference subtype switch minimum, a reference subtype switch maximum, a reference subtype switch average, and a reference subtype switch standard deviation;

program instructions to determine a test string subtype switch distribution of the one or more test strings that includes a test subtype switch minimum, a test subtype switch maximum, a test subtype switch average, and a test subtype switch standard deviation; and wherein the program instructions to identify the one or more test strings as human generated is further based on determining that the test subtype switch average is within the threshold number of the reference subtype switch standard deviations of the reference subtype switch average.

19. The computer system of claim 15, further comprising:

based on not identifying the one or more test strings as human generated, program instructions to provide an option to search, inspect, ignore, delete, or quarantine the one or more test strings.

20. The computer system of claim 15, wherein the one or more reference strings and the one or more test strings may be classified by one or more domains, and wherein identifying the one or more test strings as human generated is further based on the classified one or more domains.

\* \* \* \* \*